US008601362B2

(12) United States Patent  
Christophe

(10) Patent No.: US 8,601,362 B2  
(45) Date of Patent: Dec. 3, 2013

(54) INFORMATION PROCESSING APPARATUS, INFORMATION PROCESSING METHOD, AND COMPUTER-READABLE RECORDING MEDIUM STORING AN INFORMATION PROCESSING PROGRAM

(75) Inventor: Soulier Christophe, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 537 days.

(21) Appl. No.: 12/379,711

(22) Filed: Feb. 27, 2009

(65) Prior Publication Data

US 2009/0300477 A1 Dec. 3, 2009

(30) Foreign Application Priority Data

Feb. 27, 2008 (JP) ................... 2008-046413

(51) Int. Cl.
*G06F 9/00* (2006.01)

(52) U.S. Cl.
USPC .......................................................... 715/234

(58) Field of Classification Search
USPC .................. 715/234, 243, 254, 255
See application file for complete search history.

(56) References Cited

U.S. PATENT DOCUMENTS

| | | | | | |
|---|---|---|---|---|---|
| 5,893,131 | A | * | 4/1999 | Kornfeld | 715/236 |
| 7,818,666 | B2 | * | 10/2010 | Dorsett et al. | 715/237 |
| 2002/0007367 | A1 | * | 1/2002 | Narahara | 707/500 |
| 2004/0002952 | A1 | * | 1/2004 | Lee et al. | 707/1 |
| 2004/0221229 | A1 | * | 11/2004 | Perry | 715/514 |
| 2007/0240168 | A1 | * | 10/2007 | Guschina et al. | 719/318 |

FOREIGN PATENT DOCUMENTS

| | | |
|---|---|---|
| JP | 2004-046817 | 2/2004 |
| JP | 2005-196638 | 7/2005 |
| JP | 2005-242427 | 9/2005 |

OTHER PUBLICATIONS

W3C Recommendation: Document Object Model Level 3 Core, http://www.3.org/TR/2004/REC-DOM-Level-3-Core-20040407/ Apr. 7, 2004.
Japanese Office Action dated Jun. 19, 2012 issued in Japanese Application No. 2008-046413.

* cited by examiner

*Primary Examiner* — Kyle Stork
(74) *Attorney, Agent, or Firm* — Harness, Dickey & Pierce, P.L.C.

(57) ABSTRACT

An information processing apparatus parses document data described in a structured language to extract necessary information from the data. At least a part of the document data is stored in a storage unit, and the stored document data is parsed in order to extract information contained in the document data using. The parsing proceeds from a group of nodes having a high importance to another group of nodes having a lower importance in a network structure represented by the document data.

13 Claims, 13 Drawing Sheets

FIG.3B

```
1.  <Employee name="Robert" age="52">
2.  <Employee name="Cindy" age="33">
3.  <Employee name="Paul" age="27">
4.  <Projects>      (for Robert)
5.  <Projects>      (for Cindy)
6.  <Projects>      (for Paul)
7.  <Project name="0X23A" start="2004/04/01" stop="2005/03/31">
8.  <Project name="0X24A" start="2005/04/01" stop="2005/09/31">
9.  <Project name="0X25A" start="2005/10/01" stop="current">
10. </Projects>     (end of node)
11. </Employee>     (end of node)
12. <Project name="0X32C" start="2004/04/01" stop="2005/01/31">
13. <Project name="0X33C" start="2005/02/01" stop="2006/09/31">
14. <Project name="0X34C" start="2006/10/01" stop="current">
15. </Projects>     (end of node)
16. </Employee>     (end of node)
17. <Project name="0X56B" start="2004/04/01" stop="2005/10/31">
18. <Project name="0X57B" start="2005/11/01" stop="2006/05/31">
19. <Project name="0X58B" start="2006/06/01" stop="current">
20. </Projects>     (end of node)
21. </Employee>     (end of node)
```

FIG.11A

```
<Employee name="Robert" age="52">
    <Projects>
        <Project name="0X23A" start="2004/04/01" stop="2005/03/31">
        <Project name="0X24A" start="2005/04/01" stop="2005/09/31">
        <Project name="0X25A" start="2005/10/01" stop="current">
    </Projects>
</Employee>
<Employee name="Cindy" age="33">
    <Projects>
        <Project name="0X32C" start="2004/04/01" stop="2005/01/31">
        <Project name="0X33C" start="2005/02/01" stop="2006/09/31">
        <Project name="0X34C" start="2006/10/01" stop="current">
    </Projects>
</Employee>
<Employee name="Paul" age="27">
    <Projects>
        <Project name="0X56B" start="2004/04/01" stop="2005/10/31">
        <Project name="0X57B" start="2005/11/01" stop="2006/05/31">
        <Project name="0X58B" start="2006/06/01" stop="current">
    </Projects>
</Employee>
```

FIG.11B

```
1.  <Employee name="Robert" age="52">
2.  <Projects>
3.  <Project name="0X23A" start="2004/04/01" stop="2005/03/31">
4.  <Project name="0X24A" start="2005/04/01" stop="2005/09/31">
5.  <Project name="0X25A" start="2005/10/01" stop="current">
6.  </Projects>    (end of node)
7.  </Employee>    (end of node)
8.  <Employee name="Cindy" age="33">
9.  <Projects>
10. <Project name="0X32C" start="2004/04/01" stop="2005/01/31">
11. <Project name="0X33C" start="2005/02/01" stop="2006/09/31">
12. <Project name="0X34C" start="2006/10/01" stop="current">
13. </Projects>    (end of node)
14. </Employee>    (end of node)
15. <Employee name="Paul" age="27">
16. <Projects>
17. <Project name="0X56B" start="2004/04/01" stop="2005/10/31">
18. <Project name="0X57B" start="2005/11/01" stop="2006/05/31">
19. <Project name="0X58B" start="2006/06/01" stop="current">
20. </Projects>    (end of node)
21. </Employee>    (end of node)
```

INFORMATION PROCESSING APPARATUS, INFORMATION PROCESSING METHOD, AND COMPUTER-READABLE RECORDING MEDIUM STORING AN INFORMATION PROCESSING PROGRAM

BACKGROUND OF THE INVENTION

1. Field of the Invention

The present invention generally relates to the parsing of document data described in a structured language and the extraction of information from the parsed document data.

2. Description of the Related Art

As a result of the widespread use and development of the Internet and various Web services in the recent years, structured languages, such as the Extensible Markup Language (XML), are gaining attention as one of the most useful means of storing or communicating information for various applications. For example, Japanese Laid-Open Patent Application No. 2004-46817 discloses a technique that employs a structured document format, such as XML, for the transmission of commands and reception of response data during the exchange of data between a data storage unit and a computer.

Currently, there have been proposed two major technologies for the parsing of document data described in XML. One is the object-model based DOM (Document Object Model) that parses document data described in XML and retains resultant data in a memory as a tree structured network. DOM provides easy access to the XML structured information via navigation through the nodes of the tree structure (see W3C Recommendation: Document Object Model Level 3 Core, 7 Apr. 2004: http://www.w3.org/TR/2004/REC-DOM-Level-3-Core-20040407).

The other major parsing technology is the event-based SAX (Simple API for XML) that operates more lightly than DOM, enabling the processing of data as acquired and therefore enabling the handling of partial document. SAX, however, takes a substantial execution time when handling large-sized documents.

DOM and SAX may be implemented as an application programming interface (API) and utilized by an upper-level host application.

FIG. 11A shows an example of an XML file data structure in which an employee list is stored as XML document data. Data such as the name, age, and sex of each employee is stored in parent nodes. More detailed information, such as the past projects that the individual employee has been involved with, his or her past promotions and awards, monthly salary records, etc., may be stored in child nodes of the parent node.

When DOM is used, after the entire XML file is parsed and the entire information about all of the employees is retained in memory, access to all of the nodes can be granted at once. However, DOM takes a considerable time before the entire file is parsed and becomes accessible when the number of employees contained in the file is very large.

On the other hand, SAX parses the XML document data sequentially from its beginning, notifying the host application about events such as the detection of an element start tag or an element end tag. In the aforementioned example, SAX parses the nodes of the employee list sequentially from the beginning of the file. As soon as data about a predetermined employee is parsed, access is granted to the information about the predetermined employee. FIG. 11B shows the sequence of parsing the XML file of FIG. 11A by SAX. As shown, SAX processes the XML file data sequentially from the beginning.

However, in the aforementioned related art, the nodes in the XML document data are handled flatly, without considering the importance of individual nodes in the XML document data. In other words, in the aforementioned related art, each node is presumed to be a uniform node having a predetermined name and possibly containing several child nodes and basically the same method and property.

Meanwhile, there is a demand to quickly grasp the overall picture of stored data rather than its detailed data, such as the names of all of the employees in the above example. However, neither DOM nor SAX can satisfy such a demand. Another demand is to process XML document data that is inputted in a format other than a file or stream format, such as a live stream format. Such a demand, however, has not been sufficiently addressed by the related art such as DOM or SAX.

SUMMARY OF THE INVENTION

It is a general object of the present invention to provide an information processing apparatus, an information processing method, and a computer-readable recording medium storing an information processing program whereby one or more of the aforementioned problems are eliminated.

A more specific object is to provide an information processing apparatus, an information processing method, and a computer-readable recording medium storing an information processing program taking advantage of both the feature of SAX enabling a fast access and the feature of DOM providing easy navigability. Another object may be to provide a novel parser mode that takes into consideration the importance of individual information items during manipulation of document data described in a structured language, so that the information in the document data described in the structured language can be accessed at high speed with minimum utilization of memory and CPU and depending on the importance of the information.

According to one aspect of the present invention, an information processing apparatus for processing document data described in a structured language includes a storage unit configured to store at least a part of the document data, and a parsing unit configured to parse the at least a part of the document data in order to extract information contained in the document data. The parsing unit parses the document data from a group of one or more nodes having a high importance to another group of one or more nodes having a low importance in a network structure represented by the document data.

According to another aspect of the present invention, an information processing method for processing document data described in a structured language includes the steps of storing at least a part of the document data in a storage unit; reading the at least part of the document data from the storage unit; parsing a group of nodes in the at least part of the document data that has a high importance in a network structure represented by the document data; determining whether there is a group of one or more nodes having an importance lower than the importance of the group of nodes having the high importance; and, when there is the group of one or more nodes having the lower importance, parsing the group of nodes having the lower importance.

According to another aspect, a computer-readable recording medium stores a program for processing document data described in a structured language. Execution of the program by one or more processors in an information processing apparatus causes the one or more processors to perform the steps of storing at least a part of the document data in a storing unit; and parsing the at least a part of the document data in order to extract information contained in the document data. The parsing proceeds from a group of one or more nodes having a high importance to another group of one or more nodes having a low importance in a network structure represented by the document data.

BRIEF DESCRIPTION OF THE DRAWINGS

These and other objects, features and advantages of the invention will be apparent to those skilled in the art from the following detailed description of the invention, when read in conjunction with the accompanying drawings in which:

FIG. 3B shows an order in which the XML file is parsed;

FIG. 11A shows an example of an XML file data structure; and

FIG. 11B shows an order of parsing of the XML file by SAX.

DETAILED DESCRIPTION OF THE PREFERRED EMBODIMENTS

In the following, preferred embodiments of the present invention are described with reference to the drawings.

Figure 1:
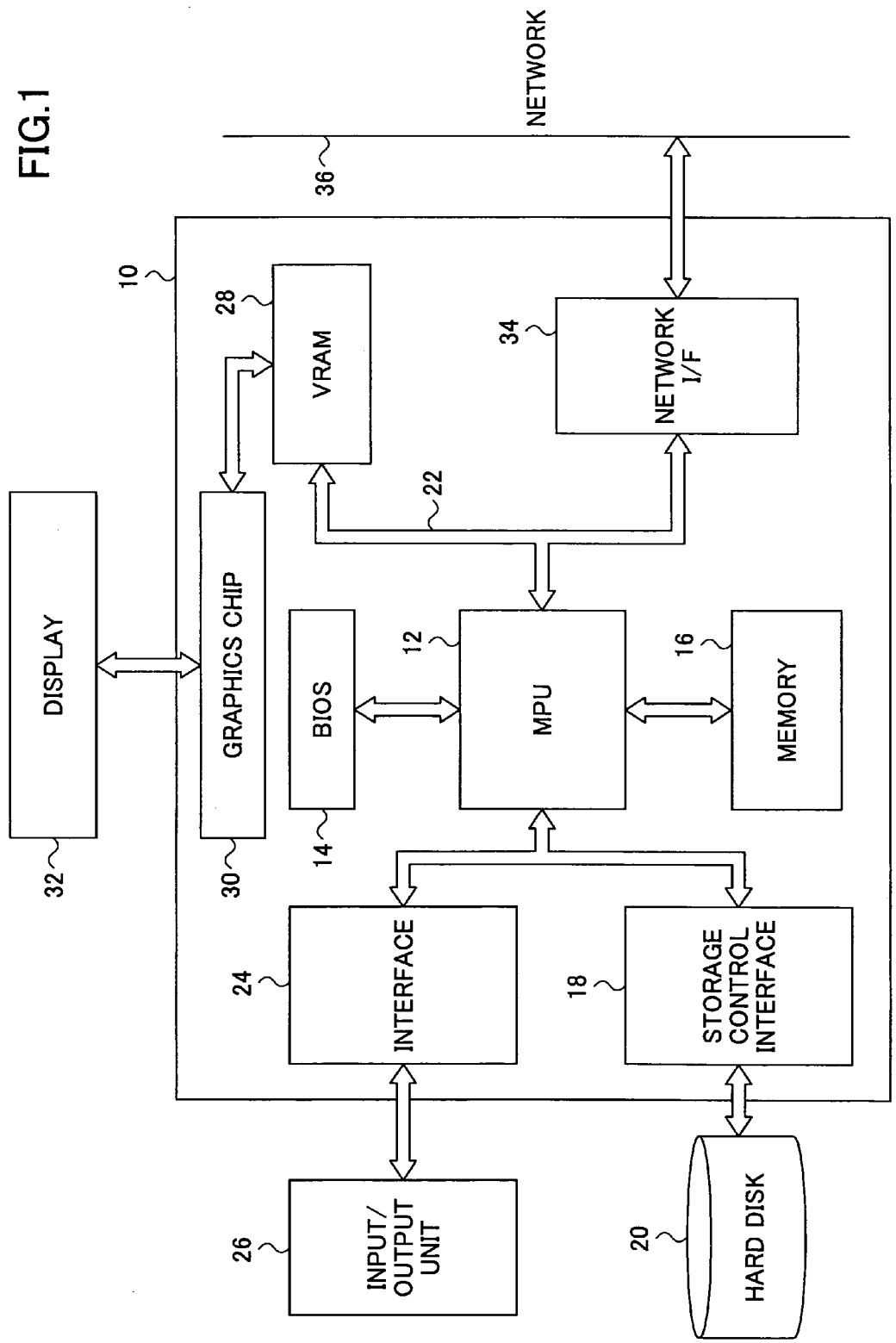
FIG. 1 shows a hardware structure of a computer apparatus according to an embodiment of the present invention.

FIG. 1 shows a schematic hardware structure of a computer apparatus 10 as an example of an information processing apparatus according to an embodiment of the present invention. The computer apparatus 10 includes a microprocessor unit (MPU) 12; a nonvolatile memory 14 storing a basic input/output system (BIOS); and a memory 16, which may be a random access memory (RAM) for providing a working memory area for enabling the processing of a program by the MPU 12. Upon booting up, the MPU 12 reads the BIOS from the nonvolatile memory 14 to perform system diagnosis. The MPU 12 also manages an input/output device 26.

To the MPU 12, there is connected a storage device 20, such as a hard disk, via an internal bus 22 and a storage control interface 18. The storage device 20 writes or reads data in response to an input or output request from the MPU 12. The storage control interface 18 manages the input and output of data to and from the storage device 20. The storage ctrl interface 18 may include an interface in accordance with various standards, such as IDE (Integrated Device Electronics), ATA (AT Attachment), serial ATA, or Ultra ATA.

The MPU 12 controls a serial or parallel interface 24, which may be in accordance with the USB or IEEE1164 standard, in order to communicate with the input/output device 26, which may include a keyboard, mouse, printer, etc., to receive an input from a user or output data to the user via the printer or the like.

The computer apparatus 10 further includes a VRAM 28 and a graphics chip 30 for processing a video signal in response to an instruction from the MPU 12 and displaying a processed video signal on a display device 32. The MPU 12 also communicates with a network interface (I/F) 34, such as a network interface card (NIC), via the internal bus 22 in order to enable the computer apparatus 10 to communicate with the outside via the network 36. In accordance with the present embodiment, the computer apparatus 10 is also capable of connecting via the network 36 with another computer apparatus (not shown) and receiving or responding to an access request from the other computer for an XML document.

The computer apparatus 10 reads a program (not shown) stored in a storage device, such as the nonvolatile memory 14, the storage device 20, an NV-RAM (not shown), or an SD card (not shown). The computer apparatus 10 loads the program into a memory area in the memory 16 in order to realize the various functional units as described later, under an appropriate operating system (OS). In accordance with the present invention, the OS architecture of the computer apparatus 10 is not particularly limited and may be provided by UNIX, AIX, or LINUX, or any other architecture as long as the OS can provide the required functions.

Figure 2:
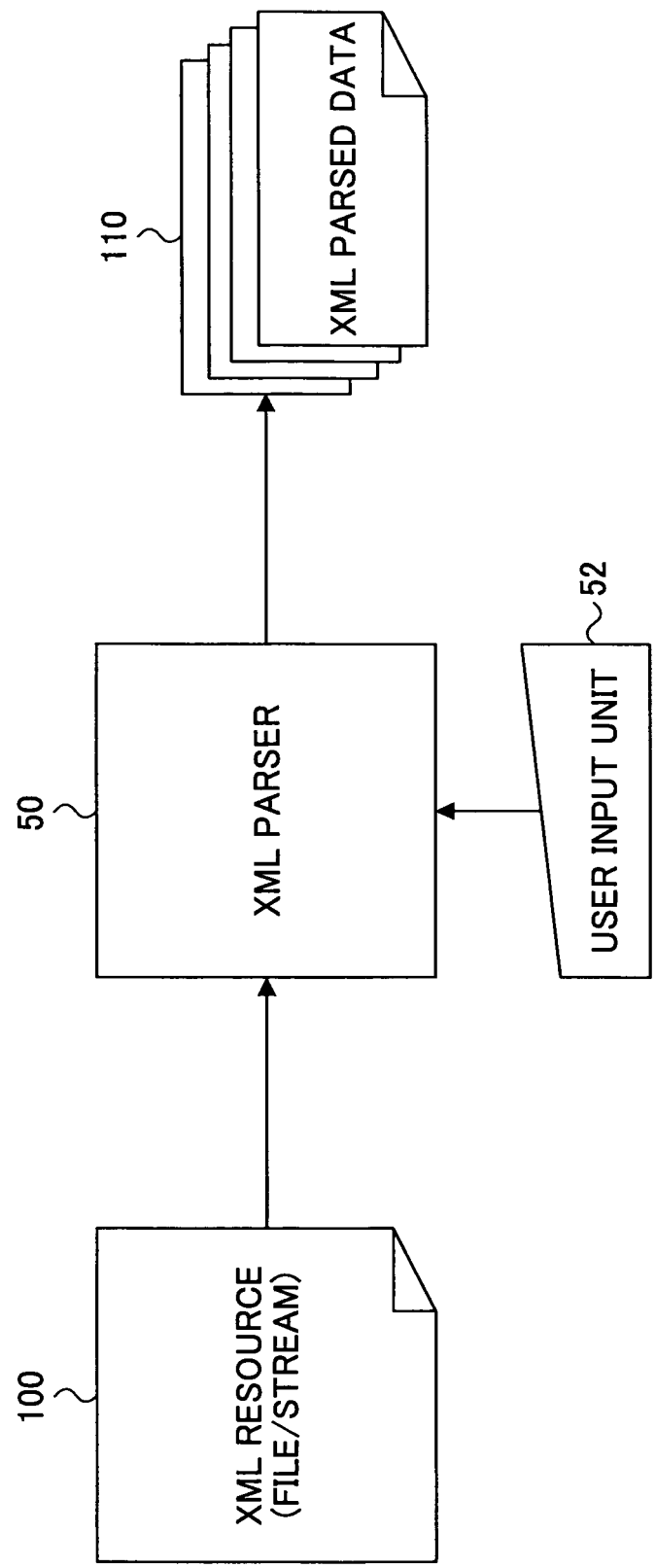
FIG. 2 shows a dataflow diagram illustrating a parsing process performed on XML document data.

FIG. 2 shows a dataflow diagram of an XML document data parsing process. An XML parser 50 shown in FIG. 2 parses the XML document data with reference to an XML resource 100 that may be inputted as either a file or a stream, and generates XML parsed data 110 as a result. During the parsing, at least some of the XML resource 100, which may have been held in the recording apparatus 20, is loaded into the memory 16. A host application (not shown) that utilizes the information extracted from the XML document data may supply the XML parser 50 with a file path or a URI (Uniform Resource Identifier) for the XML resource 100 or an input stream, as well as a parse instruction. The host application then receives the XML parsed data 110, which is the result of parsing the XML resource 100 from its beginning to end.

In response to the parsing instruction together with the input of the XML resource 100, the XML parser 50 reads the values and attributes of the nodes contained in the XML document data in accordance with the node importance, i.e., in order of descending importance of the nodes. The term "node" is intended to refer to an individual element defined by a combination of an element start tag and an element end tag in the XML document data.

The XML document data represents a tree structure network made up of the individual elements. In accordance with the present embodiment, the importance of a node can be determined by the layer of the tree structure network to which the node belongs. The XML parser 50 parses the nodes on a layer by layer basis, from the route node to the lower level layers. The route node refers to a node corresponding to the sole route element in the XML document data which is at the top of the tree structure network. In the following description, the layer to which the route node belongs is designated the 0th layer (N=0), and the layer to which a node having the route node as a parent belongs is designated the first layer (N=1), with N increasing as the layer goes down.

The XML parser 50 may be configured to handle the XML resource 100 in a stream format (including a live stream) with an unlimited data length. When time-dependent information that is generated in real-time is inputted as a stream and parsed in real-time, although the beginning and end of the stream may not be explicitly indicated, the XML parser 50 begins the parsing upon start of its use by the host application and ends the parsing upon end of use by the host application.

Thus, while the XML parser 50 can readily stop at any time, preferably synchronization is achieved at the time of starting or resumption.

The XML parser 50 may be configured so that, when the XML resource 100 in an unlimited data length stream format is inputted, the XML parser 50 regards the node that it parsed first after starting the parsing as the node immediately under the route node. In this case, the host application may be configured so that, upon starting to use the XML parser 50, the host application can reliably transmit the node immediately under the route node first so that the XML parser 50 can determine the layer to which each node belongs.

The XML parser 50 has two modes. One is an automatic mode in which the XML parser 50 automatically parses the nodes from the upper to lower layers sequentially. The other is a manual mode in which the XML parser 50 may preferentially parse a lower-level node having a designated node as a base point in accordance with a user instruction or an instruction from the host application, while parsing the nodes from the upper to lower layers sequentially.

In accordance with the present embodiment, these modes may be switched upon reception, either in advance or during the parsing, of a request from the user input unit 52 for receiving user settings via the input device 26 or the NIC 34, or upon reception of a request from an internal process of the host application.

In the following, an example of a data structure of the XML resource 100 processed by the XML parser 50 in accordance with the present embodiment is described.

Figure 3A:
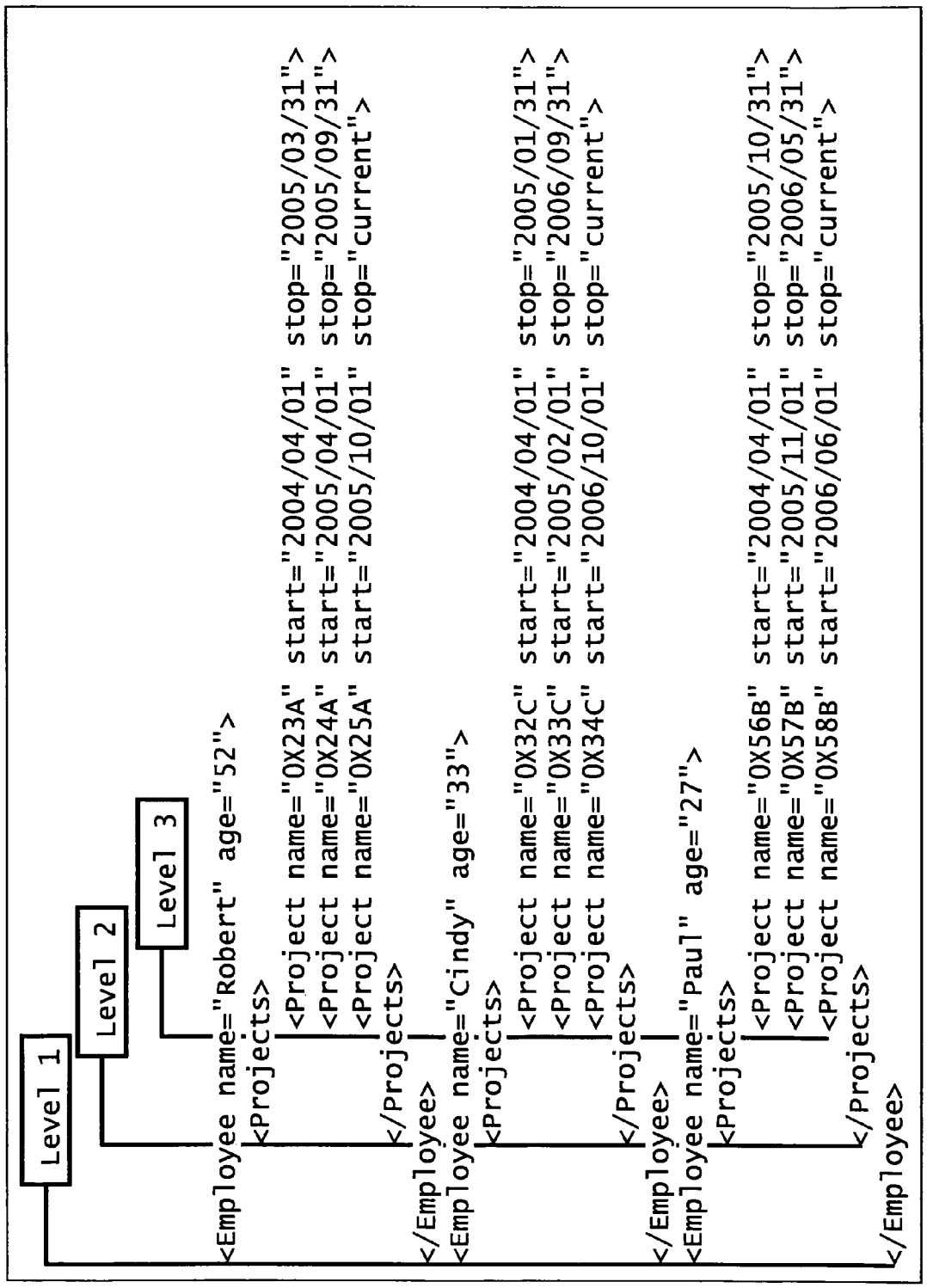
FIG. 3A shows an example of data structure of an XML file.

FIG. 3A shows an XML file data structure. In FIG. 3A, the start tag and the end tag of the route element are omitted, and the individual layers to which the individual elements belong are emphasized by indenting. The XML file shown in FIG. 3A corresponds to the case where the employee list is stored as XML document data. In the <Employee> node in the first layer, the name and age of each employee are stored as attributes. In the <Project> node in the third layer, the names and dates of start ("start") and end ("stop") of all of the past projects with which the employee has been involved are stored as attributes. The <Projects> node in the second layer is contained as a parent element of the <Project> node in the third layer and as a child element of the <Employee> node in the first layer.

FIG. 3B shows an order in which the XML file of FIG. 3A is parsed by the XML parser of the present embodiment. As shown in FIG. 3B, the XML parser 50 initially parses all of the <Employee> nodes in the first layer, and then parses all of the <Projects> nodes in the second layer, and finally parses the <Project> nodes in the third layer. Thus, the XML parser 50 parses from the upper to lower layers. In the following, the parsing process is described in greater detail.

Figure 4:
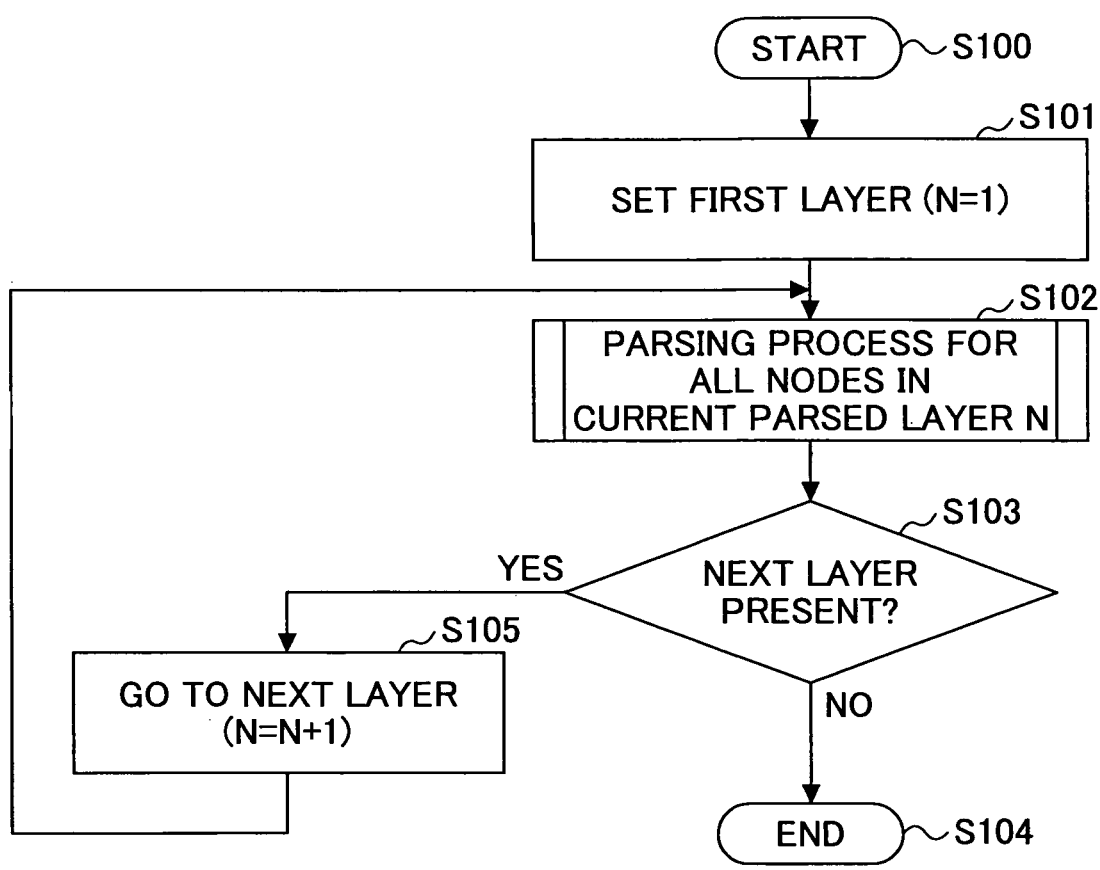
FIG. 4 shows a flowchart of a parsing process according to an embodiment.

FIG. 4 shows a flowchart of a parsing process performed by the XML parser according to an embodiment. The process shown in FIG. 4 is started in step S100 in response to an instruction from the host application to start the XML document data parsing. In step S101, a node in the first layer (N=1) immediately under the route node is set as a parsed node. In step S102, the parsing process is performed on the entire nodes in the layer N as the currently parsed layer. The details of the parsing on the entire nodes in the layer N is described later.

After the parsing on the entire nodes in the layer N is completed, it is determined in step S103 whether a layer exists under the currently parsed layer N. The determination in step S103 may involve a search for at least one node that belongs to the next layer (N+1). If at least one such node is found, it is determined that the next layer exists; if not, it is determined that the next layer does not exist.

If it is determined in step S103 that the next layer does not exist (NO), the process is branched to step S104 where the parsing process ends. On the other hand, if it is determined in step S103 that the next layer exists (YES), the process branches to step S105 where the next layer (N=N+1) is considered the current parsed layer. The process further proceeds to step S102 to repeat the above process.

In the processing routine of FIG. 4, the parsing is performed on a layer by layer basis, from the first layer immediately under the route node to the lowest layer at the end of the tree structure network of the XML document data. Upon completion of the parsing of the nodes for all of the layers, the XML parser 50 calls a call back function to notify the host application that the input stream may be closed, thereby releasing the use of the memory 16 and the MPU 12.

Figure 5:
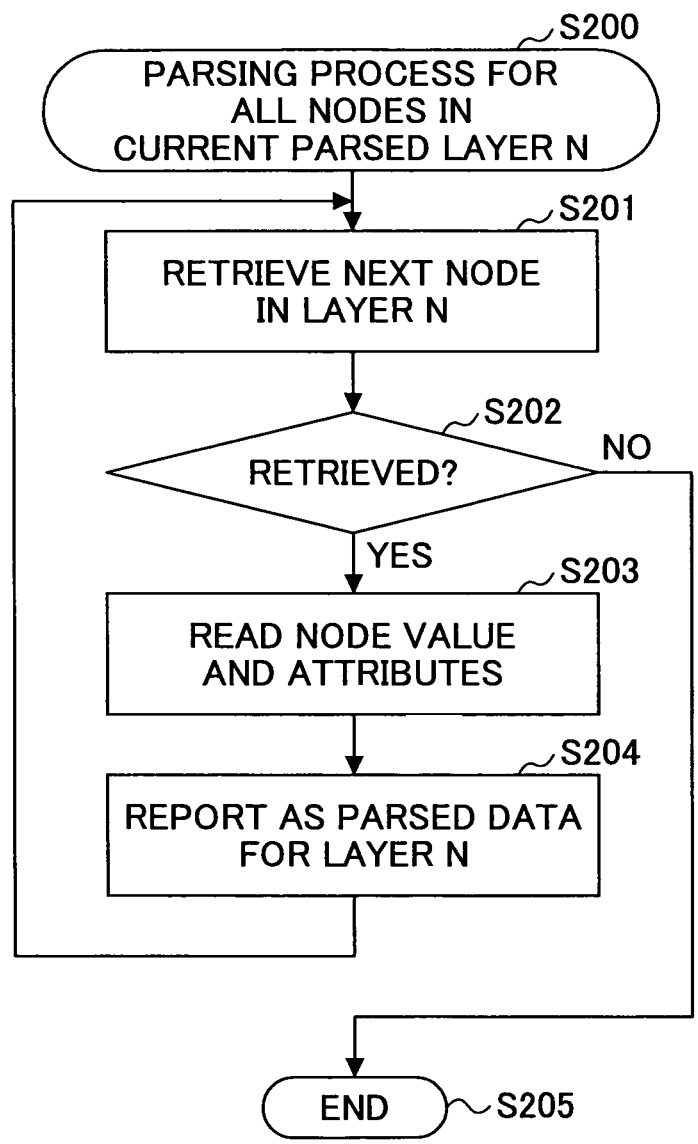
FIG. 5 shows a flowchart of a parsing of a node in a layer.

In the following, the details of the parsing for the entire nodes in the layer N are described. FIG. 5 shows a flowchart of the parsing performed on the nodes in the layer N by the XML parser according to the present embodiment. The process shown in FIG. 5 is called by the process of step S102 shown in FIG. 4 and is started from step S200. In step S201, a search for a node in the layer N is conducted. The search for a node in the layer N, which may be started from the beginning of the XML document data or from the previous search position, may involve the detection of a node defined by the element start tag and the determination as to whether the layer to which the detected node belongs is the layer N, based on the nest structure of the element start tag and the element end tag.

In step S202, it is determined whether the node that belongs to the layer N has been found. If so (YES), the process branches to step S203 where the value of the retrieved node and its attributes are read. In step S204, the host application is notified of the XML analysis data 110 about the layer N that includes the node value and attributes. The process then returns to step S201 to repeat the search for the next node that belongs to the layer N of concern.

If, on the other hand, the end of the data is reached without retrieving a node that belongs to the layer N (NO in step S202), indicating that there is no more node in the data that belongs to the layer N, the process branches to step S205 to end the processing routine, and control is returned to the process flow shown in FIG. 4. In accordance with the parsing process of the present embodiment, each time the XML parser 50 detects all of the attributes and values for an individual node, the call back function is called and the host application is notified. Thus, the present embodiment can be applied for an asynchronous stream. Based on the calling of the call back function, the host application can access the retrieved node value and attributes.

Figure 6:
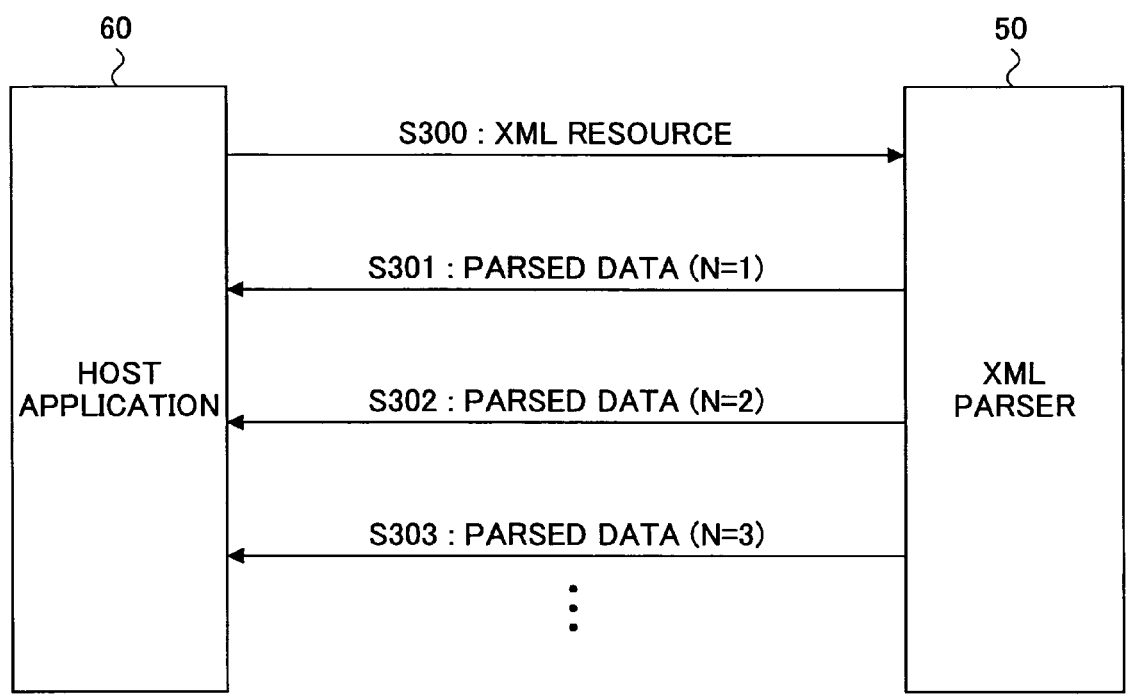
FIG. 6 shows a sequence diagram illustrating a parsing of an XML resource.

FIG. 6 shows a sequence diagram of a parsing process performed on an XML resource by the XML parser according to the present embodiment. In FIG. 6, data is exchanged between a host application 60 and the XML parser 50. Initially the host application 60 in step S300 delivers the XML resource 100 to the XML parser and issues an instruction to initiate a parsing process on the resource. In response, the XML parser 50 starts the parsing process.

In step S301, the XML parser 50 parses the first layer and delivers the parsed data 110 to the host application 60. After the first layer, the XML parser 50 parses the second layer in step S302 and delivers the parsed data to the host application 60. In step S303, the XML parser 50 parses the third layer and delivers the parsed data to the host application 60. Based on the received parsed data, the host application 60 may display relevant data on the browser.

By the processes described with reference to FIGS. 4 through 6, the nodes are parsed in descending order of importance, so that the nodes with higher importance can be quickly accessed by the host application 60. For example, in the XML file shown in FIG. 3A in which the employee list is described, the <Employee> nodes in the first layer with high importance are initially parsed so that the host application can access the names and ages of the employees. Thus, the host application can acquire a list of the employees and make it displayed on the display device 32 early.

Thus, in accordance with the XML parser of the present embodiment, information with higher importance can be accessed first before the entire XML document data is parsed, whereby information with higher importance can be extracted at high speed. Because the XML parser 50 does not require the retaining of an entire tree structure network in memory, as does DOM, the XML parser 50 can operate with less memory and at low CPU utilization. Because the XML parser 50 of the present embodiment processes data in an asynchronous manner, it can handle asynchronous streams.

In the foregoing, the process flow in the automatic mode has been described with reference to FIGS. 4 through 6. In a parsing according to another embodiment described under, the manual mode is supported whereby, while the nodes are being parsed from the upper to lower layers, a lower-level node that has a designated node M as a base point can be preferentially parsed in accordance with an instruction ("ENTER command"). In this case, the currently proceeding normal parsing process from the upper to lower layers may be temporarily interrupted by retaining the current parsed position in the memory 16.

Further, in the present embodiment, the preferential parsing can be terminated in response to another command ("EXIT command"), or upon completion of all of the nodes under the designated node M. The process can then be returned to the parsed position at the time of issuance of the ENTER command so that the normal parsing can be resumed.

In another embodiment, the normal parsing may be continued in parallel with the preferential parsing with priority given to the latter. The host application may issue an ENTER command or an EXIT command in response to a user instruction or a result of an internal process of the host application.

Figure 7:
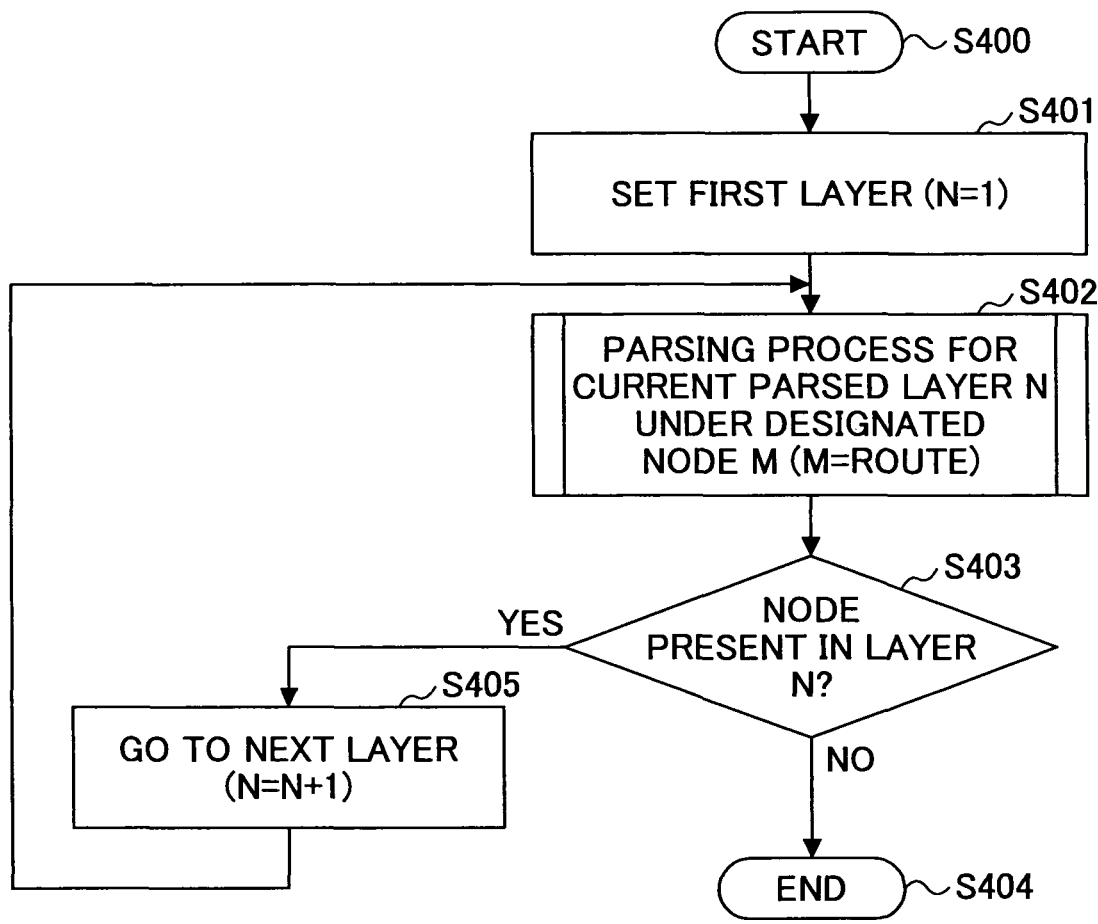
FIG. 7 shows a flowchart of a parsing process according to another embodiment.

FIG. 7 shows a flowchart of a parsing performed by the XML parser according to the present embodiment. The process shown in FIG. 7 may be started from step S400 in response to a parsing initiating instruction.

In step S401, the nodes in the first layer (N=1) are set as the parsed nodes. In step S402, the route node is designated a designated node M, and the currently parsed layer N under the route node M are parsed. The details of the parsing performed on the nodes under the designated node M in the layer N are described later.

After completion of the parsing of the layer N under the route node M, it is determined in step S403 whether, under the route node, there is at least one node in the currently parsed layer N. If it is determined that there is no such node (NO), the process branches to step S404 where the parsing ends. On the other hand, if in step S403 it is determined that there is at least one node in the layer N under the route node (YES), the process branches to step S405 where the parsed layer is advanced to the next layer (N=N+1). The process proceeds to step S402 to repeat the process.

Thus, in the processing routine shown in FIG. 7, the parsing is performed on all of the nodes in each layer from the first layer to the lowest layer in the XML document data.

In the following, the parsing of the layer N under the designated node M is described in detail.

Figure 8:
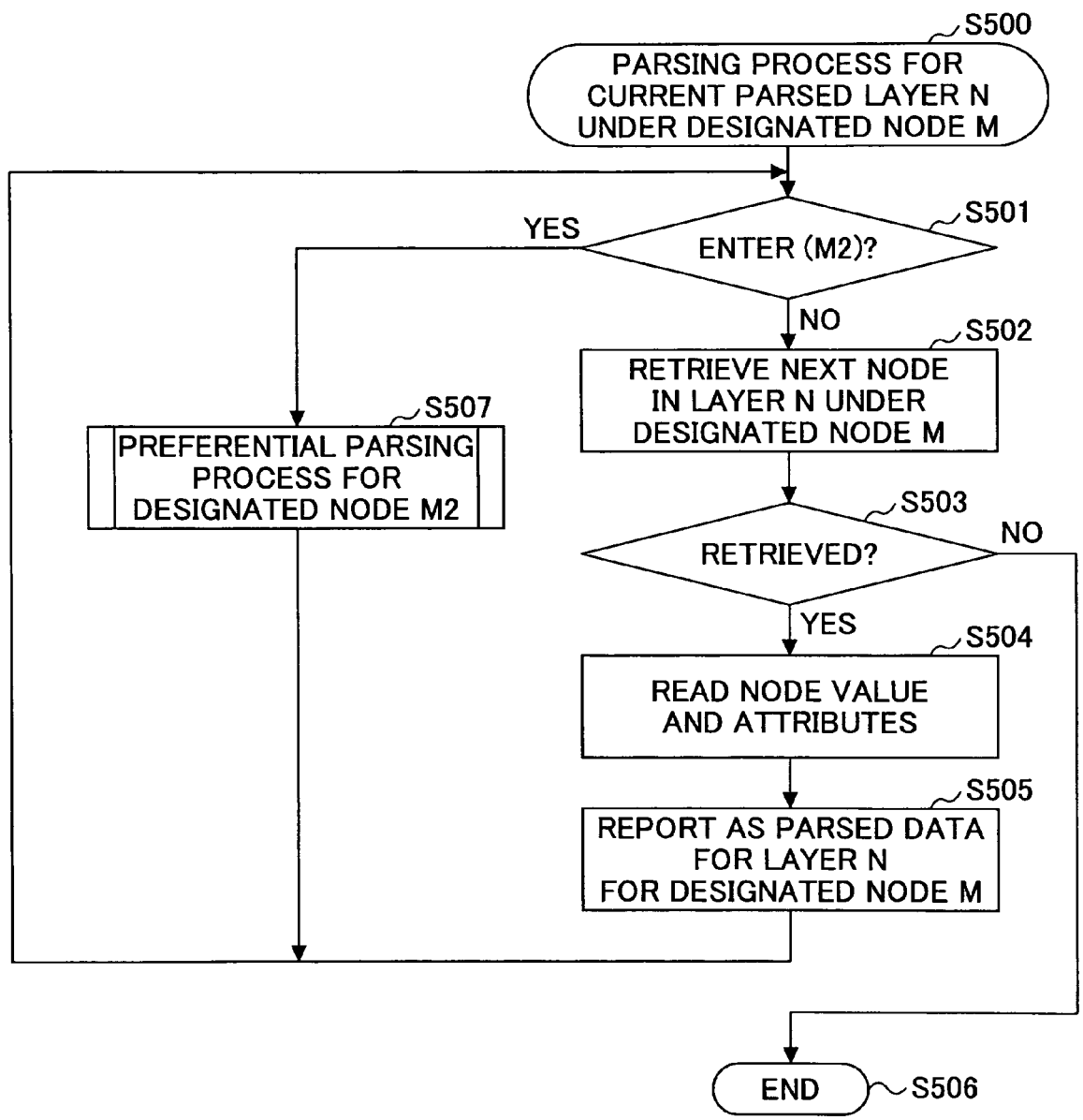
FIG. 8 shows a flowchart of a parsing of a node in a layer.

FIG. 8 shows a flowchart of the parsing performed on the nodes in the layer N by the XML parser in accordance with the present embodiment. The process shown in FIG. 8, which may be called by the process of step S402 shown in FIG. 7 or by the process of step S603 shown in FIG. 9 as described later, starts at step S500. When called by the process of step S402 shown in FIG. 7, the designated node is the route node, and the parsed layer is the layer N. When called by the process of step S603 shown in FIG. 9, the designated node and the parsed layer are a node M2 and a layer N2 designated in the process of step S603.

In step S501, it is determined whether an ENTER command instructing preferential parsing is issued. If it is determined in step S501 that no ENTER command is issued (NO), the process branches to step S502 where a node in the layer N under the designated node M is searched for. In step S503, it is determined whether the search has turned up a node that belongs to the layer N under the designated node M as the base point. If in step S503 it is determined that a node of the layer N under the designated node M is present (YES), the process branches to step S504. In step S504, the value and attributes of the retrieved node are read, and in step S505 the host application is notified of the analysis data 110 for the layer N. The process then returns to step S501 in order to search for the next node that belongs to the layer N under the designated node M.

On the other hand, if in step S503 the element end tag of the designated node M is reached without finding a node that belongs to the layer N under the designated node M (NO), it is determined that there is no more node that belongs to the layer N under the designated node M. Thus the process branches to step S506 to end the processing routine. The control is then returned to the original routine of FIG. 7 or 9.

If it is determined in step S501 that the ENTER command has been issued (YES), the process branches to step S507. In step S507, the normal parsing is temporarily interrupted, and while retaining the parsed position at the time of interruption in memory 16, a preferential parsing is performed on a node M2 designated as an argument of the ENTER command. Upon completion of the preferential parsing, the process is returned to step S501.

In the following, the preferential parsing using the designated node M2 as the base point is described.

Figure 9:
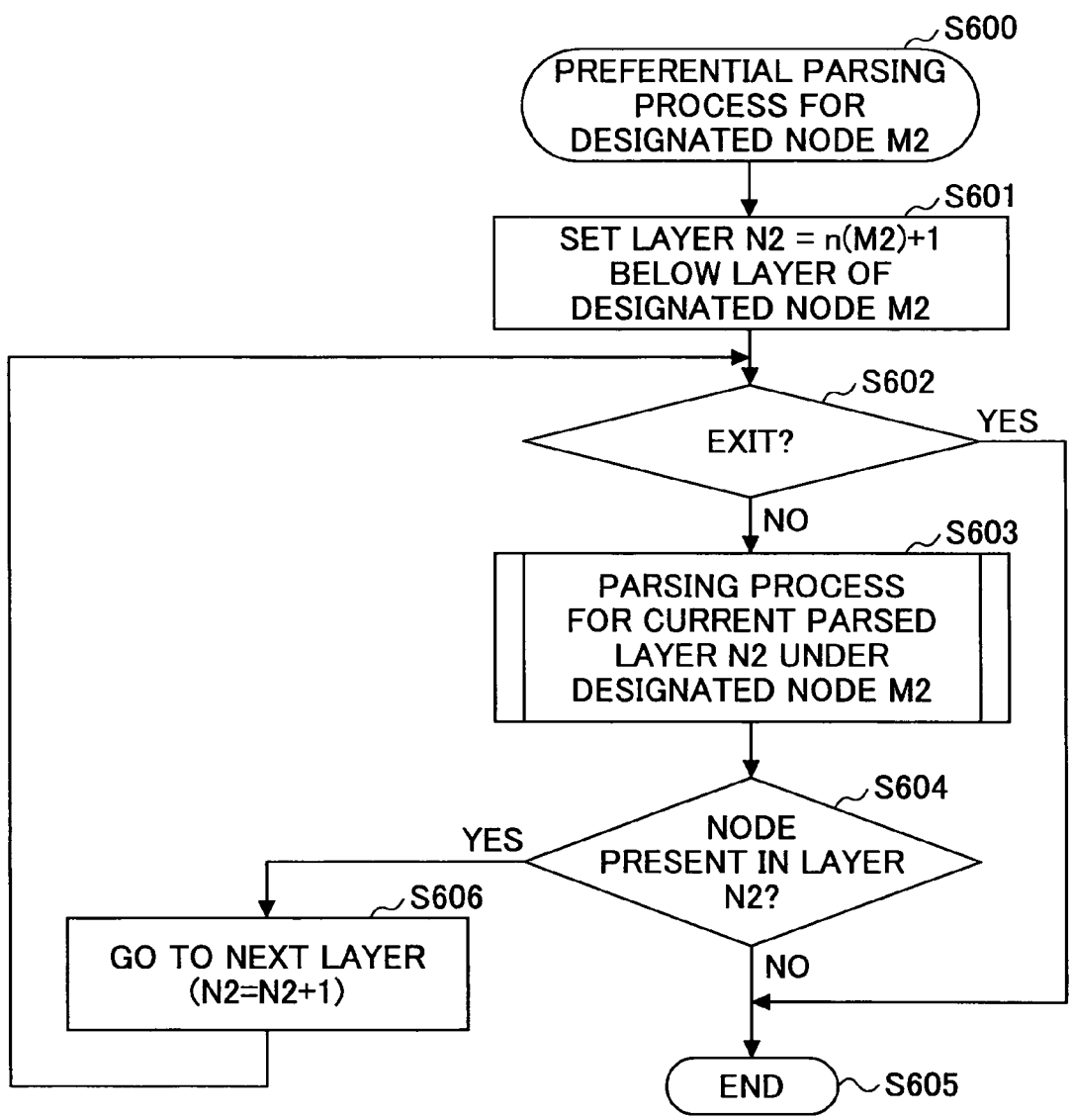
FIG. 9 shows a flowchart of a preferential parsing performed during the parsing process of FIG. 7.

FIG. 9 shows a flowchart of the preferential parsing process in the parsing according to the present embodiment. The process of FIG. 9, which is called by the process of step S507 shown in FIG. 8, starts at step S600. In step S601, a node in a layer N2 (N2=n(M2)+1, where n(M2) is the layer to which the designated node M2 belongs) below the layer to which the designated node M2 belongs is set as the parsed node.

In step S602, it is determined whether an EXIT command instructing an exit from the preferential parsing has been issued. If it is determined in step S602 that no EXIT command is issued (NO), the process branches to step S603. In step S603, the currently parsed layer N2 is parsed under the designated node M2. In step S603, the process shown in FIG. 8 is recursively called to perform the parsing of the layer N2 under the designated node M2. Thus, during the preferential parsing of the designated node, a preferential parsing of another designated node can be instructed by the ENTER command.

After the parsing of the layer N2 under the designated node M2 is completed, it is determined in step S604 whether there is at least one node in the layer N2 under the designated node M2. If it is determined in step S604 that there is no such node (NO), this indicates a completion of the preferential parsing. Thus the process branches to step S605 to end the preferential parsing, and then the control is brought to the processing routine of FIG. 8.

On the other hand, if in step S604 it is determined that there is at least one node in the layer N2 under the designated node M2 (YES), the process branches to step S606 where the parsed layer is advanced to the next layer (N2=N2+1). The process further proceeds to step S602 to repeat the process.

Thus, in the processing routine shown in FIG. 9, the parsing is performed on all of the nodes under the designated node M2 in each layer from the layer immediately under the designated node M2 to the terminal layer with respect to the designated node M2 as the base point.

If in step S602 it is determined that the EXIT command has been issued (YES), the process branches to step S605 to terminate the preferential parsing and hands the control to the processing routine of FIG. 8.

The start and end of the preferential parsing (by cancelling or completion of preferential parsing) may be nested. For example, during the preferential parsing of a node X in the first layer, preferential parsing under a node Y in the second layer under the node X may be instructed. In this case, after completion of the preferential parsing under the node Y in the second layer, preferential parsing under the node X in the first layer is resumed, and further the normal parsing is resumed upon completion of the preferential parsing under the node X in the first layer.

Figure 10A:
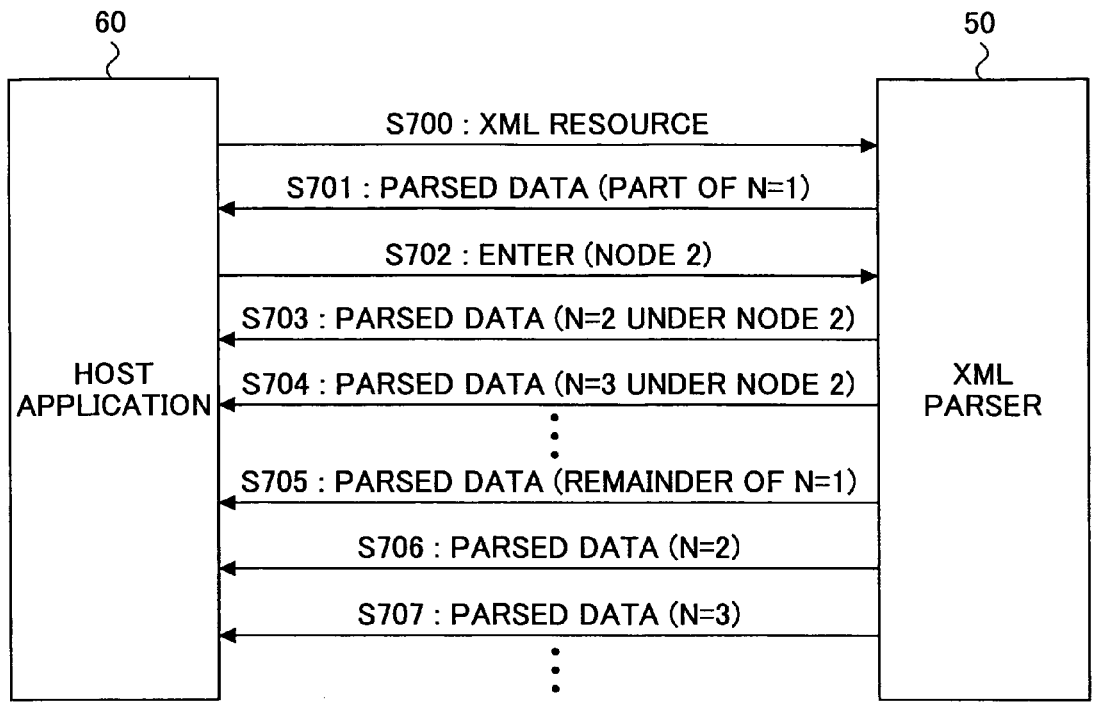
FIG. 10A shows a sequence diagram of a parsing performed on an XML resource involving an instruction for a preferential parsing of a node.
Figure 10B:
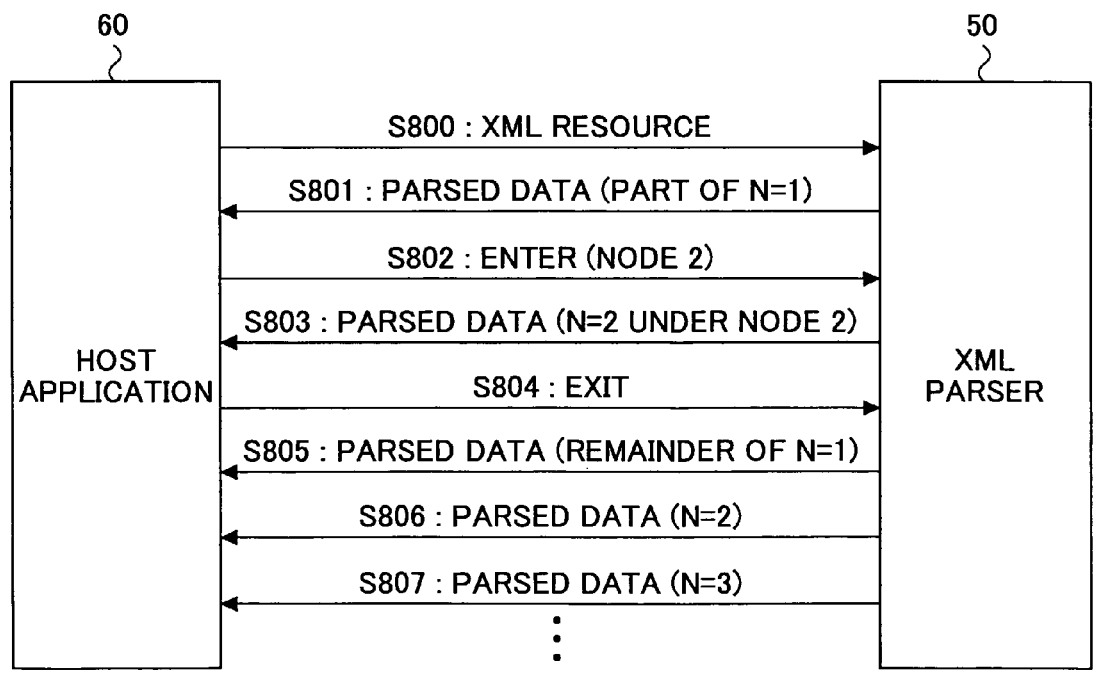
FIG. 10B shows a sequence diagram of a parsing performed on an XML resource involving an instruction for cancellation of the preferential parsing of the node.

FIGS. 10A and 10B show sequence diagrams of a parsing performed on the XML resource by the XML parser in the present embodiment. FIG. 10A corresponds a case where preferential parsing of a node 2 in the first layer is instructed by an ENTER command. FIG. 10B corresponds to a case where preferential parsing of node 2 in the first layer is designated by the ENTER command and then cancelling of the preferential parsing is instructed by an EXIT command.

In the sequence shown in FIG. 10A, the host application 60 initially delivers the XML resource 100 to the XML parser 50 in step S700, and then instructs parsing of the resource. In response to the instruction, the XML parser 50 starts a parsing process, parses the first layer first in step S701, and delivers the parsed data for the first layer to the host application sequentially.

During the parsing of the first layer, upon reception of an ENTER command designating node 2 in step S702, the XML parser 50 interrupts the parsing of the first layer and instead parses the second layer under the node 2 in step S703. The parsed data for the second layer under node 2 is sequentially delivered to the host application. Thereafter, the XML parser 50 in step S704 parses the third layer under the node 2, and delivers the parsed data for the third layer under node 2 to the host application sequentially.

After completion of the parsing of the terminal layer with respect to the node 2 as the base point, the XML parser 50 in step S705 returns the parsed position back to the position at the time the ENTER command was issued in order to perform the remaining parsing of the first layer. The XML parser 50 then delivers the parsed data to the host application 60. In step S706, the XML parser 50 parses the second layer and delivers the parsed data to the host application. In step S707, the XML parser 50 parses the third layer and delivers the parsed data to the host application.

In the present example, a node under the node 2 may possibly be redundantly parsed. Depending on the installed memory capacity for a specific purpose, data obtained during preferential parsing may be cached in memory 16 so that the redundant process can be omitted.

In the sequence shown in FIG. 10B, the host application 60 in step S800 initially delivers the XML resource 100 to the XML parser 50 while instructing the parsing of the resource. In response, the XML parser 50 starts the parsing process and initially parses the first layer in step S801. The XML parser 50 delivers the parsed data for the first layer to the host application sequentially.

During the parsing of the first layer, when an ENTER command designating a node 2 is issued in step S802, the XML parser 50 interrupts the parsing of the first layer, performs a preferential parsing on the second layer under node 2 in step S803, and then delivers the parsed data for the second layer under node 2 to the host application sequentially.

During the parsing of the second layer under node 2, when an instruction to cancel the preferential parsing under node 2 is issued via an EXIT command in step S804, the preferential parsing is terminated. In step S805, the XML parser 50 returns the parsed position back to the position at the time of calling of the ENTER command, and perform the remaining parsing of the first layer. The XML parser 50 delivers the parsed data to the host application 60.

Thereafter, in step S806, the XML parser 50 parses the entire second layer and delivers the parsed data to the host application. In step S807, the XML parser 50 parses the entire third layer and delivers the parsed data to the host application.

By the process described with reference to FIGS. 7 through 10, a node with higher importance can be preferentially parsed, so that the node with higher importance can be preferentially accessed by the host application. It also becomes possible to guide the parsing process to a lower-level structure flexibly based on the parsed result, with respect to a parsed node as a base point. For example, in the case of the XML file of FIG. 3A, the <Employee> nodes in the first layer having high importance are initially parsed, so that the host application can access the names and ages of the employees. At this time, by performing a preferential parsing designating a specific employee that has been parsed, detailed data about the specific employee can be preferentially parsed and accessed.

Thus, in accordance with the parsing process of the present embodiment, information can be accessed in descending order of importance before the entire XML document data is parsed. Furthermore, a lower-level structure can be preferentially parsed using the parsed information as a base point. Thus, faster navigation to information that is important to a user or a host application is provided. In accordance with the present embodiment, the XML parser can perform a parsing process with less memory and at lower CPU utilization, and realize the same easy navigability that DOM provides.

As described above, in accordance with the present embodiment, a novel parser mode is provided that has the feature of SAX enabling short-time access and the feature of DOM for easy navigability, wherein the importance of information is considered during manipulation of document data described in a structured language.

Thus the various embodiments of the present invention may provide an information processing apparatus, an information processing method, an information processing program, and a recording medium storing the information processing program whereby information in document data described in a structured language can be accessed at high speed depending on importance while requiring small memory and low CPU utilization.

The information processing apparatus in accordance with the various embodiments of the present invention is not limited to the computer apparatus used in the foregoing embodiments. Various other information processing apparatuses, such as personal computers, application servers, databases servers, as well as image forming apparatuses such as digital multifunction apparatuses and digital copy machines may be used depending on a particular purpose.

Also, the structured language is not limited to XML but may include other structured languages that can be updated during parsing, such as dynamic XML, HTML (Hyper Text Markup Language), XHTML (extensible HTML), etc.

The above-described functions may be realized by a computer-readable program described in a legacy programming language or an object-oriented programming language, such as an assembly language, C, C++, C#, and Java. Such a computer-readable program may be stored in a machine-readable recording medium and distributed. Examples of the recording medium include a read-only memory (ROM), an electrically erasable programmable read-only memory (EEPROM), an erasable programmable read-only memory (EPROM), a flash memory, a flexible disc, a compact-disc read-only memory (CD-ROM), a CD rewritable (CD-RW), a digital versatile disc (DVD), an SD memory, and a magnetooptic (MO) disc.

Although this invention has been described in detail with reference to certain embodiments, variations and modifications exist within the scope and spirit of the invention as described and defined in the following claims.

The present application is based on the Japanese Priority Application No. 2008-046413 filed Feb. 27, 2008, the entire contents of which are hereby incorporated by reference.

What is claimed is:

1. An information processing apparatus for processing document data described in a structured language, the information processing apparatus, comprising:
   at least one processor configured to control a plurality of units, the plurality of units including,
      a storage unit configured to store at least a part of the document data, the document data having a plurality of nodes arranged in a tree structure, the tree structure having a plurality of levels, each node including an element of the part of the document data, an importance of each of the nodes being defined by a layer in the tree structure to which the node belongs;
      a parsing unit configured to parse the plurality of nodes on layer-by-layer basis in an order of decreasing importance in order to extract information contained in the elements of the part of the document data, wherein the parsing unit parses all nodes associated with a first layer before parsing nodes associated with a second layer, the first layer having a higher importance than that of the second layer, wherein,
      in response to a first instruction provided external to the parsing unit by a user, for a preferential parsing of a designated node, the parsing unit stores a current parsed position, temporarily interrupts the layer-by-layer basis parsing and preferentially parses a node under the designated node, the node under the designated node having an importance lower than an importance of the designated node, and
      in response to a second instruction for canceling the preferential parsing of the designated node, the second instruction provided external to the parsing unit by a user, the parsing unit resumes the layer-by-layer basis parsing by returning to the stored parsed position.

2. The information processing apparatus according to claim 1, wherein the stored parsed position indicates a node that was parsed before the instruction for the preferential parsing was issued.

3. The information processing apparatus according to claim 1, wherein the parsing unit resumes the layer-by-layer basis parsing by returning to a node that was parsed before the preferential parsing instruction was issued, after the node under the designated node was parsed.

4. The information processing apparatus according to claim 1, wherein the document data includes a file, a stream, or a live stream of an XML document or a dynamic XML document.

5. The information processing apparatus according to claim 1, wherein the parsing unit transmits a call back function to a host application each time information is extracted for a node, the call back function notifying the host application that the host application can access the extracted information.

6. The information processing apparatus according to claim 1, wherein
   the parsing unit is configured to resume the layer-by-layer basis parsing by returning to the node that was parsed before the preferential parsing instruction was issued after the node under the designated node is parsed, if the second instruction for canceling the preferential parsing of the designated node is not issued.

7. An information processing method for processing document data described in a structured language, the information processing method comprising the steps of:
   storing a least a part of the document data in a storage unit, the document data having a plurality of nodes arranged in a tree structure, the tree structure having a plurality of levels, each node including an element of the part of the document data, an importance of each of the nodes being defined by a layer in the tree structure to which the node belongs;
   reading the at least part of the document data from the storage unit;
   parsing the plurality of nodes on a layer-by-layer basis in an order of decreasing importance in order to extract information contained in the elements of the part of the document data, wherein the parsing step parses all nodes associated with a first layer before parsing nodes associated with a second layer, the first layer having a higher importance than that of the second layer; and
   in response to a first external instruction by a user for a preferential parsing of a designated node, storing a current parsed position, temporarily interrupting the layer-by-layer basis parsing and preferentially parsing a node under the designated node, the node under the designated node having an importance lower than the importance of the designated node, and
   in response to a second external instruction by a user for canceling the preferential parsing of the designated node, resuming the layer-by-layer parsing by returning to the stored parsed position.

8. The information processing method according to claim 7, further comprising:
   resuming the layer-by-layer basis parsing by returning to the node that was parsed before the preferential parsing instruction was issued after the node under the designated node is parsed, if the second external instruction for canceling the preferential parsing of the designated node is not issued.

9. The information processing method according to claim 7, further comprising:

transmitting a call back function to a host application each time information is extracted for a node, the call back function notifying the host application that the host application can access the extracted information.

10. A non-transitory computer-readable recording medium storing a program for processing document data described in a structural language, wherein execution of the program by one or more processors in an information processing apparatus causes the one or more processors to perform the steps of:

storing a least a part of the document data in a storage unit, the document data having a plurality of nodes arranged in a tree structure, the tree structure having a plurality of levels, each node including an element of the part of the document data, an importance of each of the nodes being defined by a layer in the tree structure to which the node belongs;

parsing the plurality of nodes on a layer-by-layer basis in an order of decreasing importance in order to extract information contained in the elements of the part of the document data, wherein the parsing step parses all nodes associated with a first layer before parsing nodes associated with a second layer, the first layer having a higher importance than that of the second layer; and in response to a first external instruction by a user for a preferential parsing of a designated node, storing a current parsed position, temporarily interrupting the layer-by-layer basis parsing and preferentially parsing a node under the designated node, the node under the designated node having an importance lower than the importance of the designated node and in response to a second external instruction by a user for canceling the preferential parsing of the designated node, resuming the layer-by-layer parsing by returning to the stored parsed position.

11. The non-transitory computer-readable recording medium according to claim 10, wherein the execution of the program by the one or more processors in the information processing apparatus further causes the one or more processors to perform the steps of;

resuming the layer-by-layer basis parsing by returning to the node that was parsed before the preferential parsing instruction was issued after the node under the designated node is parsed, if the second external instruction for canceling the preferential parsing of the designated node is not issued.

12. The non-transitory computer-readable recording medium according to claim 10, wherein the document data includes a file, a stream, or a live stream of an XML document or a dynamic XML document.

13. The non-transitory computer-readable recording medium according to claim 10, wherein the execution of the program by the one or more processors in the information processing apparatus further causes the one or more processors to perform a step of:

transmitting a call back function to a host application each time information is extracted for a node, the call back function notifying the host application that the host application can access the extracted information.

* * * * *

UNITED STATES PATENT AND TRADEMARK OFFICE
CERTIFICATE OF CORRECTION

| | | |
|---|---|---|
| PATENT NO. | : 8,601,362 B2 | Page 1 of 1 |
| APPLICATION NO. | : 12/379711 | |
| DATED | : December 3, 2013 | |
| INVENTOR(S) | : Christophe Soulier | |

It is certified that error appears in the above-identified patent and that said Letters Patent is hereby corrected as shown below:

On the Title Page, Item (75) should read

-- (75)    Inventor:    Christophe Soulier, Chiba (JP) --.

Signed and Sealed this
Thirtieth Day of September, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,601,362 B2 | Page 1 of 1 |
| APPLICATION NO. | : 12/379711 | |
| DATED | : December 3, 2013 | |
| INVENTOR(S) | : Christophe Soulier | |

It is certified that error appears in the above-identified patent and that said Letters Patent is hereby corrected as shown below:

On the Title Page, Item (12), delete "Christophe" and insert --Soulier--.

On the Title Page, Item (75) should read

-- (75)   Inventor:   Christophe Soulier, Chiba (JP) --.

This certificate supersedes the Certificate of Correction issued September 30, 2014.

Signed and Sealed this
Twentieth Day of January, 2015

Michelle K. Lee
*Deputy Director of the United States Patent and Trademark Office*